United States Patent [19]

Morikawa

[11] Patent Number: 5,062,058

[45] Date of Patent: Oct. 29, 1991

[54] IMAGE PROCESSING METHOD FOR COLOR SCANNER

[75] Inventor: Seiichiro Morikawa, Kaisei, Japan

[73] Assignee: Fuji Photo Film Co., Ltd., Kanagawa, Japan

[21] Appl. No.: 325,276

[22] Filed: Mar. 17, 1989

[30] Foreign Application Priority Data

Mar. 17, 1988 [JP] Japan ................................. 63-64416

[51] Int. Cl.$^5$ .............................................. G06F 3/05
[52] U.S. Cl. .................................... 364/521; 364/518; 340/706; 358/75
[58] Field of Search ....................... 364/518, 521, 522; 340/747, 750, 706; 382/75, 80

[56] References Cited

U.S. PATENT DOCUMENTS

| | | | |
|---|---|---|---|
| 4,654,720 | 3/1987 | Tozawa | 358/283 |
| 4,717,967 | 1/1988 | Yoshida | 358/296 |
| 4,745,576 | 5/1988 | Hasegawa et al. | 364/900 |
| 4,791,589 | 12/1988 | Blazo et al. | 364/518 |
| 4,794,382 | 12/1988 | Lai et al. | 340/703 |
| 4,879,595 | 11/1989 | Niki et al. | 358/80 |
| 4,955,680 | 9/1990 | Froese-Peeck et al. | 315/382 |

Primary Examiner—Gary V. Harkcom
Assistant Examiner—Phu K. Nguyen
Attorney, Agent, or Firm—Sughrue, Mion, Zinn Macpeak & Seas

[57] ABSTRACT

An image processing method in a color scanner which includes an original base adapted to receive therein an original cassette that accomodate a color original, a light source for linearly radiating the original cassette as received in the original base, image sensors for color separating a transmitting or reflected light in a linear region of the color original into R, G and B for detection, a signal processing section for processing RGB image signals outputted from the image sensors by linearly scanning the color original to output four color image data such as C, M, Y and black, a color monitor connected to the signal processing section for displaying images of the four color image data, a data input device for inputting data required for the signal processing section and for designating a position where the color monitor displays and an output device for halftoning the four color image data to prepare a printing color separating block, which comprises the steps of: preparing a density cumulated histogram of the color original by using the RGB image signals, obtaining highlight point candidates and shadow point candidates of the color original due to the density cumulated histogram, displaying the highlight point candidates and the shadow point candidates on the image displayed on the color monitor, designating a highlight point and a shadow point by using the data input device, and setting condition data for the signal processing section in accordance with image data of the designated highlight point and shadow point.

6 Claims, 9 Drawing Sheets

FIG. IIA

FIG. IIB

FIG. IIC

FIG. IID

IMAGE PROCESSING METHOD FOR COLOR SCANNER

BACKGROUND OF THE INVENTION

1. Field of the Invention

This invention relates to an image processing method for a color scanner, and more specifically to an image processing method for a color scanner of a plane scanning type, which is adapted to prepare a color separation for printing C (cyan), M (magenta), Y (yellow) and K (black) as If-toned after color separating signals which are obtained by linearly scanning a color original have been color corrected, sharp intensified and gradation converted and so on, and in which highlight and shadow points of the color original required for the signal processing are selected out of a display picture frame of a color monitor for designation.

2. Description of the Prior Art

The prior art has heretofore proposed a layout retouch system which is so called the "total system" in a printing plate making process. This total system is adapted to input a pattern input by a digitizer to display patterns and images (pictures) in a color cathode ray tube (CRT). a color original is scanned by a color scanner at a specified magnification and is stored in a memory means after A/D conversion. A stored color original is displayed in the color CRT according to inputted pattern information and edited by an interactive input in a main memory of a computer, and is then restored in the format corresponding to the output picture frame in a memory. Next, the color image information according to the output picture frame after editing is D/A converted and inputted to an output control circuit for the color scanner, thereby obtaining a described layout image. Disadvantages derived from such a layout retouch system are in that a great capacity of a storage medium is required for storing the information of the color original, and that a high speed computer is needed for edition process, thus rendering the system arrangement highly expensive and taking much time for edition process and the like.

Figure 1:
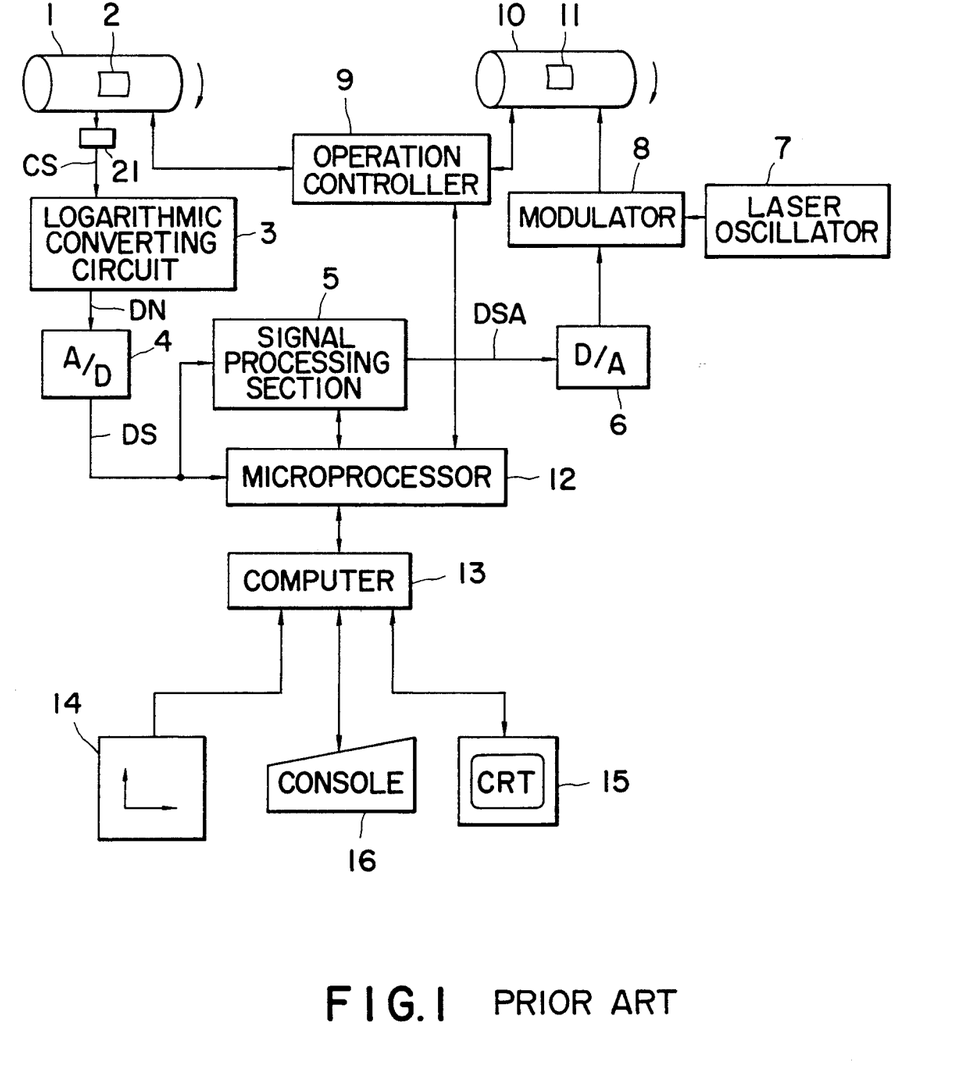
FIG. 1 is a block diagram showing one example of a conventional image input and output system.

A proposal (Japanese Patent Laid-open No. 59-11062) has made to provide an image input and output system by which the aforementioned shortcomings are eliminated, as shown in FIG. 1. A color original 2 pasted on a rotatable input drum 1 is image outputted in a dot form to a color paper 11 pasted on a rotatable output drum 10 according to information as pattern inputted by a digitizer 14. The color original 2 is scanned in a dot form by a read head 21 and then is color separated. A color separated signal CS therefor is inputted to a logarithmic converting circuit 3 by which the color separated signal CS is converted to a density signal DN. The density signal DN is then converted in an A/D converter 4 to a digital density signal DS. The digital density signal DS is inputted to a signal processing section 5 and a microprocessor 12 and is subjected by the signal processing section 5 to processes color correction, sharpness intensification, gradation conversion and the like. An image information DSA as processed is converted to an analog signal by a D/A converter 6 and is then inputted to a modulator 8 in a laser beam printer to modulate a laser beam from a laser oscillator 7 thereby exposing in a dot form on the color paper 11 of the output drum 10 by an output head (not shown).

On the other hand, a console 16 is provided for a data and command input unit and is adapted to input the inputted data and the like to the computer 13 by which the processed information is displayed in a graphic display 15 of an interactive type. The computer 13 is also connected to the microprocessor 12 of a subsystem. The density signal DS from the A/D converter 4 is inputted to the microprocessor 12 which is further connected to the signal processing section 5 for computing process. It is noted that the positions of the input and output drums 1 and 10 are respectively detected by detectors (not shown). The position information thereof being inputted to an operation controller 9. At the same time, the operation controller 9 is connected to the microprocessor 12 so as to drive and control a positional relation between these input and output drums 1 and 10 relatively by means of the operation controller 9. The digitizer 14 includes the origin coordinates and X-Y axes inherent in the device and may move the origin to a desired point and readily rotate the coordinates by processing the signal. Locations where the images are placed on the digitizer 14 and the input drum 1 may establish a corresponding guide such as a pin or the like in a plurality of common positions. The digitizer 14 is in turn connected to the computer 13 to input a shape of the image and desired positional coordinates.

Figure 2:
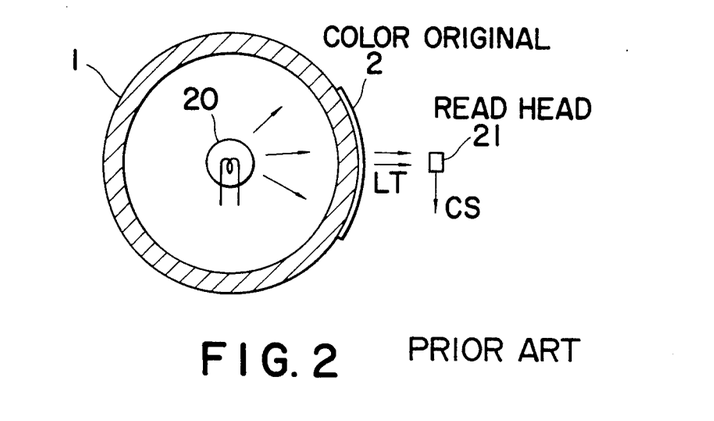
FIG. 2 is a view explanatory of the manner in which a color original is pasted on input drum.

The aforementioned image input and output system, shown in FIG. 2, is designed so that the color original 2 is directly pasted on the transparent and smooth surfaced cylindrical input drum 1 formed of glass or the like when reading the original, and that a light source 20 inside the input drum 1 emits light to the color original 2 whereby a transmitted light LT from the color original 2 is received by the read head 21 to input the image of the color original 2. In the instance, if a clearance on the order of a wave length of light is provided between the color original 2 and the input drum 1, Newton's rings (interference fringe) are formed between the back of the color original 2 and the surface of the input drum 1 under the infringe action of light to present unevenness in density in a striped form on the color original 2 thereby deteriorating the quality of the color original. For this reason, conventionally hyperfine grain powder is scattered between the color original 2 and the input drum 1, or fillers are applied thereto. Disadvantages derived from the use of the powder or the fillers are in that the former renders grain visual at a higher magnification of the image and involves a difficulty in handling, and that the latter causes troubles in application, wiping and so on.

The conventional color scanner has required a skilled operator for determining the conditions of color separation and color processing. However, the time required for determing these conditions takes more than the period of time for which the scanner is actually operated. Particularly, the quality of finished image depends upon determination of highlight and shadow points of the image required for the signal processing so that the operator determines the above points with the most serious of attention. In addition, the conventional color scanner is complicated in its operation.

SUMMARY OF THE INVENTION

The present invention is provided in views of what has above discussed. It is an object of the present invention to provide an image processing method for a color scanner of a plane scanning type wherein a density cumulated histogram is obtained by automatically analyzing original data under a well workable operation, without requiring troublesome original sticking, to display each of candidates for highlight and shadow points so that the highlight and shadow points are designated so as to correspond to the image to be displayed, thereby processing the image in correspondence with a desired position thereon.

According to one aspect of this invention, for achieving the objects described above, there is provided an image processing method in a color scanner which includes an original base adapted to receive therein an original cassete that accommodates a color original, a light source for linearly radiating the original cassette as received in the original base, image sensors for color separating a transmitted or reflected light in a linear region of the color original into R, G and B for detection, a signal processing section for processing RGB image signals outputted from the image sensors by linearly scanning the color original to output four color image data such as C, M, Y and black, a color monitor connected to the signal processing section for displaying images of the four color image data, a data input for inputting data required for the signal processing section and for designating a position where the color monitor displays and an output means for half-toning the four color image data to prepare a printing color separation. The method comprises the steps of preparing a density cumulated histogram of the color original by using said RGB image signals, obtaining highlight point candidates and shadow point candidates of the color original due to the density cumulated histogram, displaying the highlight point candidates and the shadow point candidates on the image displayed on the color monitor, designating a highlight point and a shadow point by using the data input means, and setting condition data for the signal processing section in accordance with image data of the designated highlight point and shadow point.

The nature, principle and utility of the invention will become more apparent from the following detailed description when read in conjunction with the accompanying drawings.

PREFERRED EMBODIMENTS OF THE INVENTION

Figure 3:
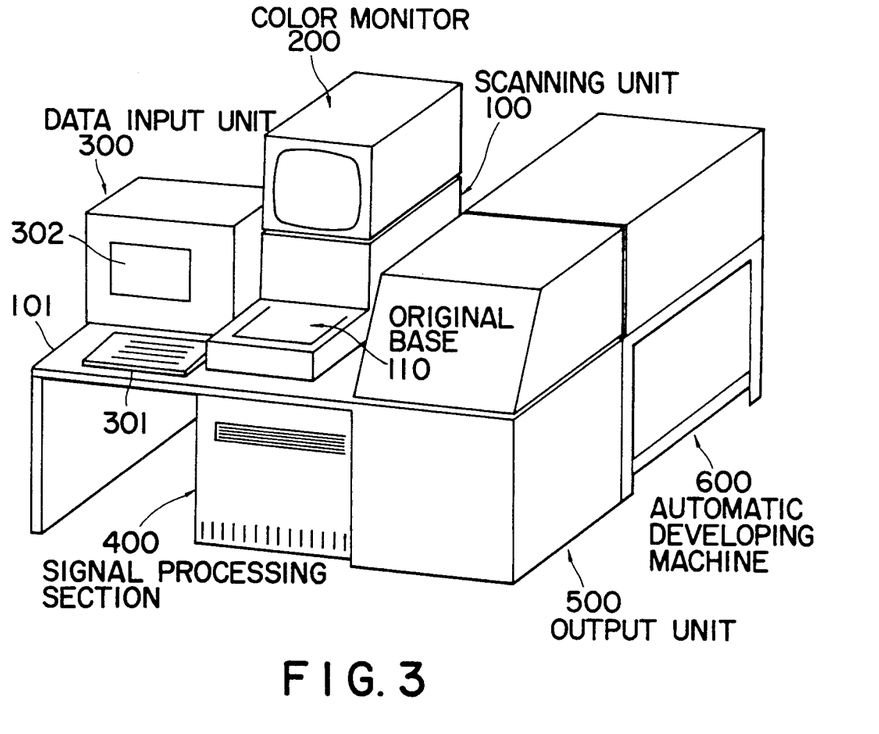
FIG. 3 is a view showing an overall configuration of one embodiment of the present invention.

FIG. 3 shows an overall configuration of a color scanner to which the present invention is applied and which comprises a scanner 100 that is provided at the top thereof with a color monitor 200 for color displaying an output image. The scanner 100 is carried on a main frame desk 101 and is formed forwardly thereof with an original base 110 or holder which is slidably mounted in the system and adapted to receive an original cassette as will be described later for plane scanning a color original mounted on the main frame desk 101 is a data input unit 300 which is adapted to input required data, commands and the like under the operation of an operator. The main frame desk 101 is provided thereunder with a signal processing section 400 adapted to process image data of the original as received thereby inputting signals of colors such as C, M, Y and black (K). The data input unit 300 includes a board section 301 and a cathode ray tube (CRT) 302, the former having a mouse and the like for inputting the data with the aid of the operator, the latter serving as means for displaying a required information. An output unit 500 is provided operatively to output a half-toned film such as to prepare a color separation on the basis of the data processed by the signal processing section 400. Annexed to the output unit 500 is an automatic developing machine 600 for developing a color separation film outputted from the output unit 500. It is noted that the arrangement of the respective components is not limited to what is shown in FIG. 1.

Figure 4:
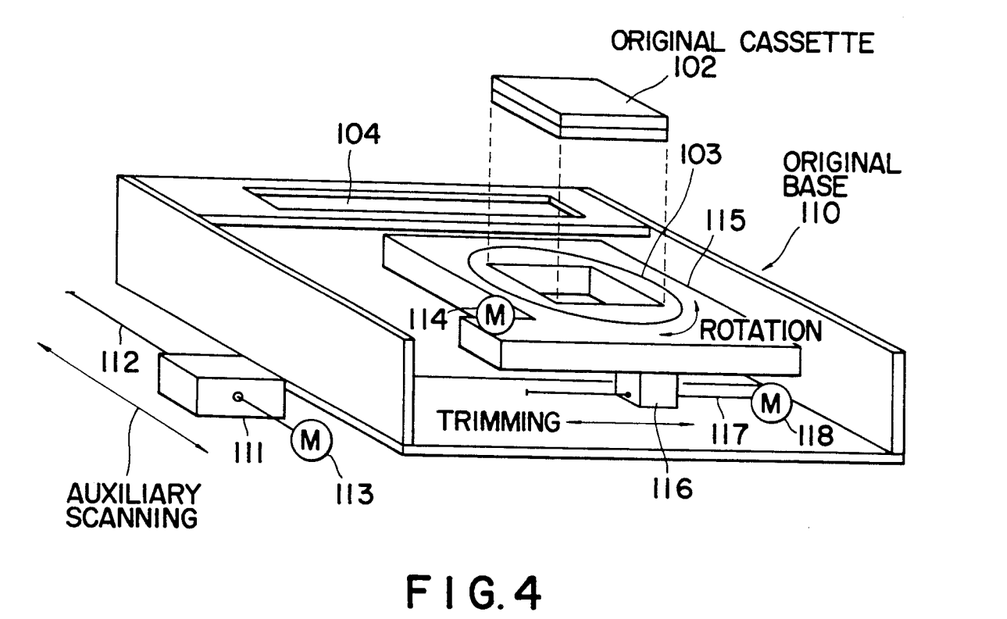
FIG. 4 is a structual view of one form of an original base of the present invention.

FIG. 4 shows a configuration of the original base 110 for the scanner 100. The original base 110 in a housing form is generally adapted to scan in the direction of auxiliary scanning by a movable member 111 coupled to the original base 110 and a wire 112 connected thereto, and a motor 113. A rotatable table 115 is disposed in the original base 110 and rotated by a motor 114 in the direction as indicated by the drawing. The rotatable table 115 is operatively formed at its center with a cassette receptacle 103 for receiving the original cassette 102. The rotatable table 115 is generally adapted to scan in the direction of trimming by a movable member 116 coupled thereto, a wire 117 and a motor 118 connected to the movable members. The movable members 111 and 116 may be respectively scanned by establishing the relation between a screw rod and a nut. The original base 110 carries a correction zone 104 on its top and its starting end in the direction of the auxiliary scanning to read a magnification adjusting chart, thus adjusting an optical system at the beginning of reading the image.

Figure 5:
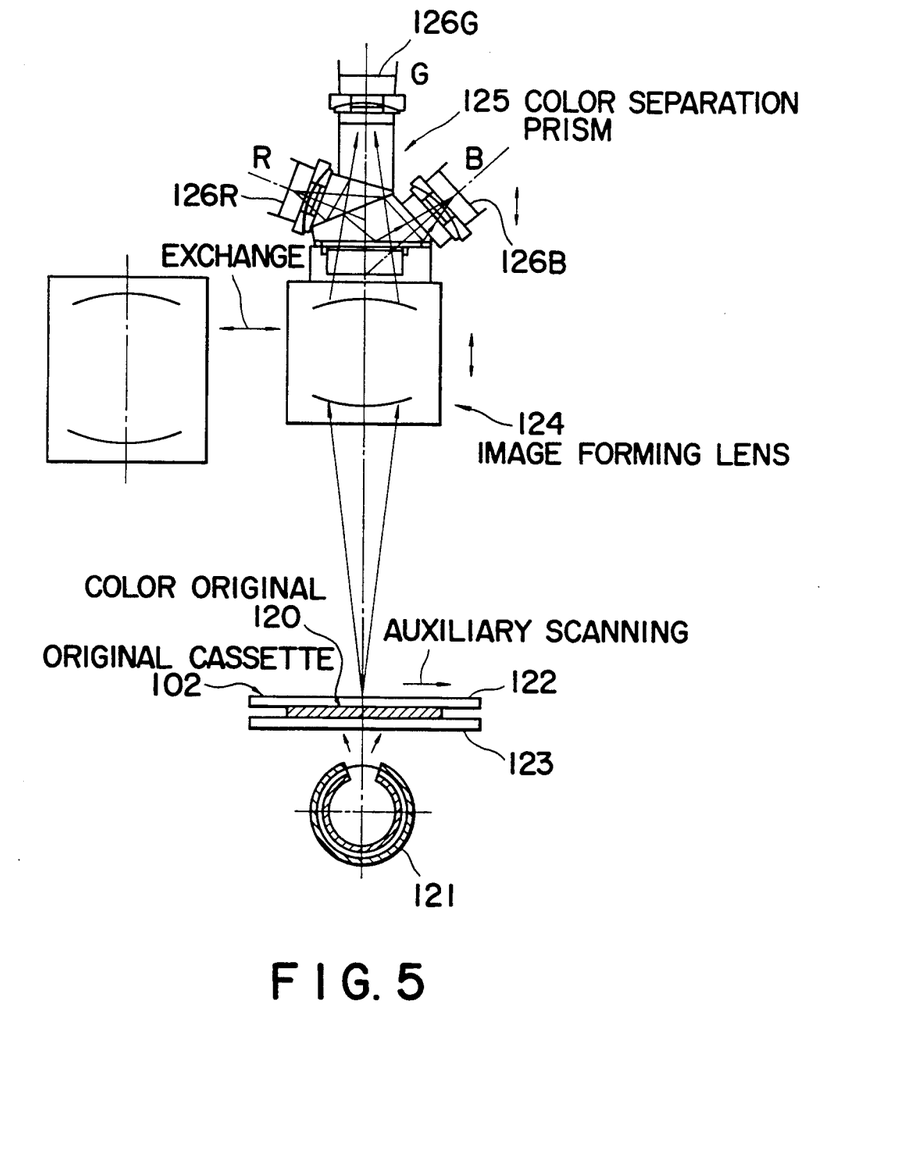
FIG. 5 is a representation showing an optical system for an image input means.
Figure 6:
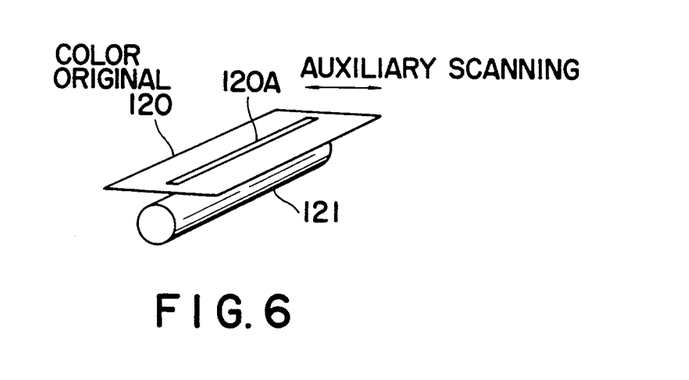
FIG. 6 is a perspective view showing a relation between an original and a light source.

FIG. 5 shows an optical system for the input area of the scanner 100. The original cassette 102 received in the cassette receptacle 103 is irradiated by a linear operative type fluorescent lamp 121 downwardly arranged. The original cassette 102 contains a color original 120 such as a color reversal film or the like, which is held between a pair of antihalation original supporting transparent glasses 122 and 123. Image light transmitted through the original cassette 102 is inputted to an image forming lens 124 at a predetermined magnification and to a color separation prism 125 and is then color separated into the three primary colors of R, G and B. The color-separated three colors are respectively inputted into image sensors 126R, 126G and 126B each formed of a charge coupled device (CCD) or the like and are then converted to an image signals PS for R, G and B. The image forming lenses 124 may be plural in number and exchanged by a turret with a lens system of a prescribed magnification. FIG. 6 is a representation explanatory of a scanning relation between the fluorescent lamp 121 and the color original 120 wherein the image as a whole is read by scanning a linear main scanning line 120A in the auxiliary scanning direction simultaneously with reading the same.

Figure 7:
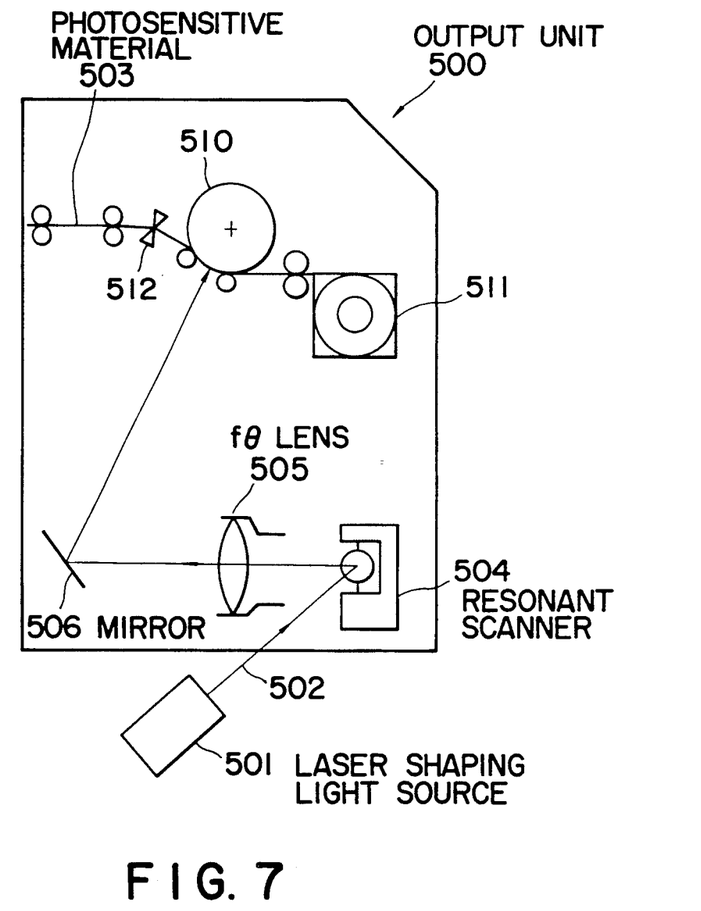
FIG. 7 is a structural view showing one form of an output unit.

FIG. 7 is a view schematically showing a configuration of an output unit 500. The output unit 500 is actuated as a slave of the signal processing section 400 and establishes a certain control sequence in response to a command transmitted by an RS-232C (a kind of interface system) to have the result state replied to a CPU 401 of the signal processing section 400. More specifically, when a status check signal is transmitted from the CPU 401 to the output unit 500, the latter transmits a "ready" signal if it is in an expose condition. Next, an "OK" signal is sent back in response to an inquiry signal for exposure preparation, transmitted from the CPU 401 thereby effecting exposure. The image signal transmitted from the signal processing section 400 is half-toned by a half-toning circuit 531 as will be described later and then converted to an ON/OFF signal. This ON/OFF signal is exposed to a photosensitive material 503 by a laser beam 502 emitted by a laser shaping light source 501 formed of laser diodes. The laser beam 502 is subjected to main scanning by the use of a resonant scanner 504. The main scanned laser beam is exposed to the photosensitive material 503 on an auxiliary scanning drum 510 by an $f\theta$ lens 505 and a mirror 506. The auxiliary scanning drum 510 is adapted to auxiliary scan the laser beam 502 and is rotated by a DC servo-motor of a PLL (Phase Locked-Loop) control. The photosensitive material 503 is received in a photosensitive material magazine 511 and conveyed through the auxiliary scanning drum 510 by conveyor rollers. The photosensitive material 503 is cut by a cutter 512 into segments of a predetermined length and is then discharged.

A half-toning circuit 531 is half-toned by a digital system which is adapted to successively compose the image signal with the sum (dot data) of threshold values of 8 bits. The dot data are held in the form of an ROM if they are standardized but are loaded from a floppy disk provided as an option if they are other than the standards. The output unit 500 is a slave to the signal processing section 400 at any time and provides a fixed sequence to the command sent by the RS-232C. The output unit 500 has a function to only send back the state of result but not initiate communication from the unit.

With the aforementioned arrangement, a series of sequences may be effected by having the signal processing section 400 controlled the output unit 500 by communication. The output unit 500 also has a function to start from the panel of the signal processing section 400 which consists of an initial load, cleaning, cut, and a setting of photosensitive material residual capacity register and the like. The initial load referred to herein is termed the process by which a photosensitive material 503 is sent to a predetermined position such as to cut the light struck (covered) portion of the material to bring the latter in the initial condition when the photosensitive material magazine 511 is mounted or the cover is opened on the occurrence of a jam. The cleaning is meant to refer to the process by which the photosensitive material 503 is drawn to a certain extent and then fed to an automatic developing machine 600 for its operation thereby replenishing it with a developer, fixer, rinsing water and the like. The cutting is meant for the process by which the photosensitive material 503 drawn out for exposure is cut and discharged. The setting of the photosensitive material residual capacity register is a function performed in such a manner that the photosensitive material residual capacity is subtracted and displayed whenever it is cut and discharged if it is set when mounting the photosensitive material magazine 511.

Figure 8:
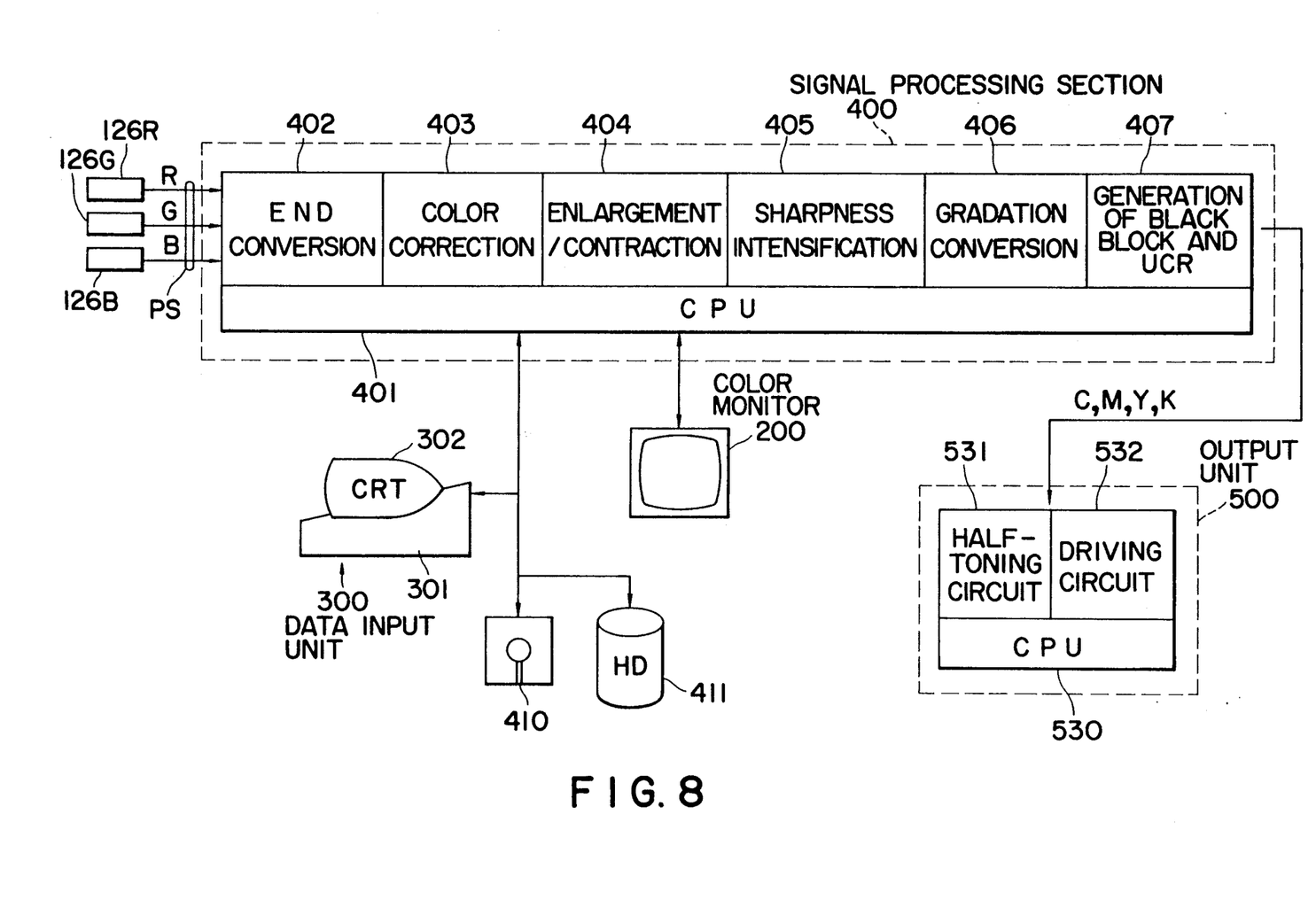
FIG. 8 is a block diagram showing a circuit system of the present invention.

The internal arrangement of the color scanner is made as what is shown in FIG. 8. The RGB image signals PS outputted from the image sensors 126R, 126G and 126B of the scanner 100 are respectively inputted to the signal processing section 400. The signal processing section 400 includes the central processing unit (CPU) 401 for its entire control to perform functions such as an END (equivalent neutral density) conversion 402, color correction 403, enlargement or contraction 404, sharpness intensification 405, gradation conversion 406, and generation 407 of a black block and UCR (under color removal) if necessary. A floppy disk 410 and a hard disk 411 are connected to the signal processing section 400 to provide a means for reading and storing data as required. The color monitor 200 and the data input unit 300 are connected to the signal processing section 400 to transmit the color signals for four colors such as C, M, Y and K (black) to the output unit 500 emitting light from the laser shaping light source 501 by dint of the half-toning circuit 531 and the driving circuit 532. The half-toning circuit 531 and the driving circuit 532 are adapted to be controlled by the CPU 501.

Figure 9:
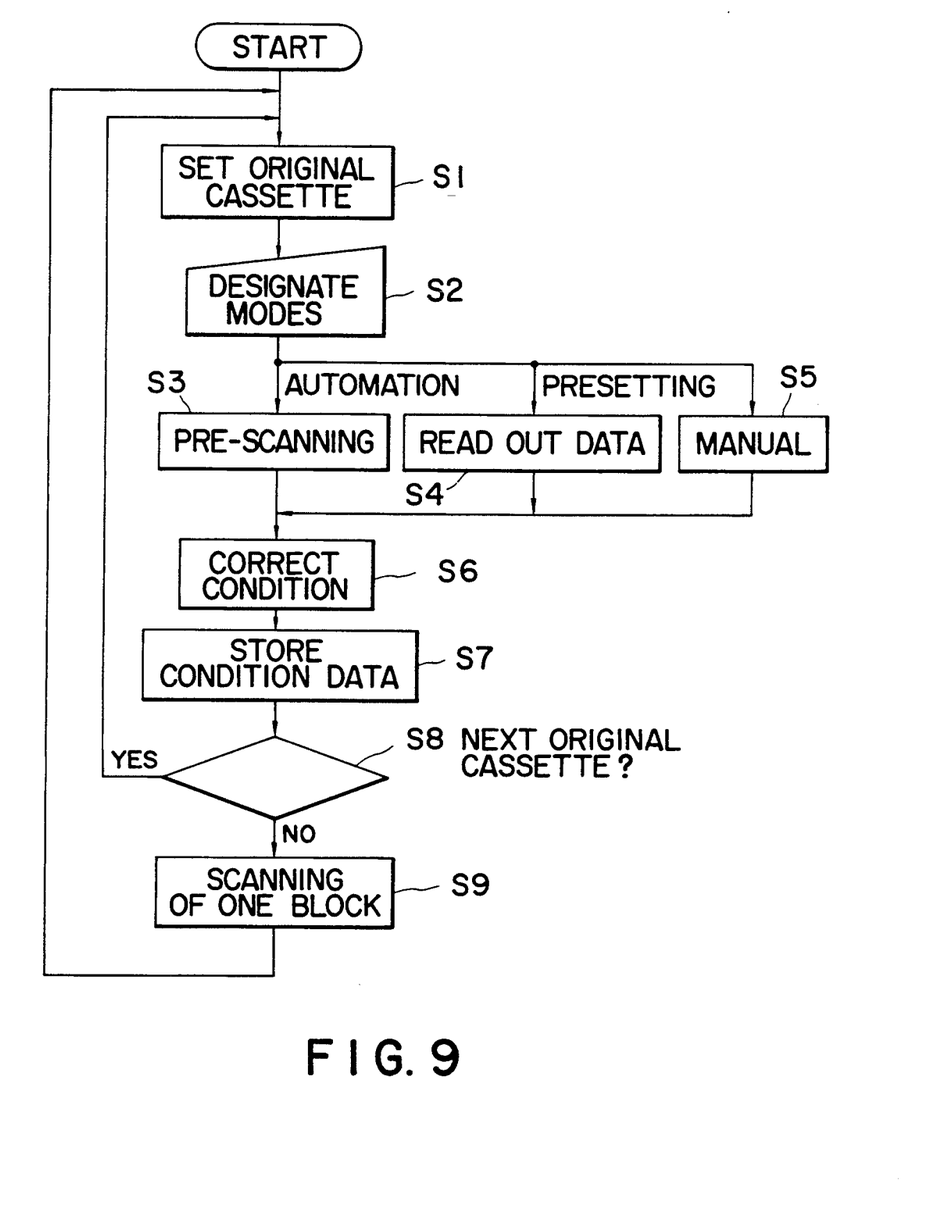
FIG. 9 is a view showing a flow chart illustrating one example of functions of the present invention.

It will be apparent from the following descriptions how the instant system is operated with reference to a flow chart in FIG. 9.

Now, the original cassette 102 is set to the scanner 100 (Step S1) and then received in the cassette receptacle 103. On the other hand, an operator manipulates the board section 301 of the data input unit 300 to designate modes (automation presetting and manual operation) for condition setting up (Step S2). When the automation, the presetting and the manual operation modes are selected severally, a pre-scanning is effected for condition setting (Step S3), condition data which has been pre-stored in a memory are read out (Step S4), and condition data is inputted from the board section 301 (Step S5), respectively. The condition data are meant to refer to coefficient values for the color correction, sharpness coefficients for the sharpness intensification, and an inclination of the gradation conversion and so on. The automatic setting by means of the pre-scanning is made in such a manner as shown in Japanese Patent Laid-open No. 62-111569 and No. 62-111570 filed by the instant applicant. The conditions set in this manner are displayed in the CRT 302. If correction is required for this condition, the operator manually corrects the set condition (Step S6) and then stores the condition data in the memory (Step S7).

After pre-processing as aforementioned, the image of the color original 120 in the inputted original cassette 102 is read out in such a manner that the original cassette 102 is rotated by the rotatable table 115 and moved in the direction of trimming by the movable member 116 and in the direction of the auxiliary scanning by the other movable member 111 so that a region of a line 120A as shown in FIG. 6 is mainly scanned. The light irradiated and transmitted from the fluorescent lamp 121 is inputted to the image forming lens 124 and color separated by the color separation prism 125 to R, G and B thus image forming on the image sensors 126R, 126G and 126B, respectively. The detected image signals PS for one line are outputted from the image sensors 126R, 126G and 126B and then inputted to the signal processing unit 400 to process those which are the END conversion 402, the color correction 403, the enlargement or contraction 404, the sharpness intensification 405, the gradation conversion 406, and the generation 407 of the black block and UCR under the conditions as set described hereinbefore. The color correction is made in such a manner as shown in for example, Japanese Patent Laid-open No. 58-178355 whereas the sharpness intensification is effected in such a manner as illustrated in, for example, Japanese Patent Laid-open No. 60-54570. What is shown in Japanese Patent Laid-open No. 59-11062 inclusive of the END conversion and the gradation conversion may be applied to the instant system. In view of the fact that the aforementioned gradation conversion tends to considerably vary an modification characteristic depending upon highlight and shadow points, the present invention deals with a method described hereinafter.

Figure 10:
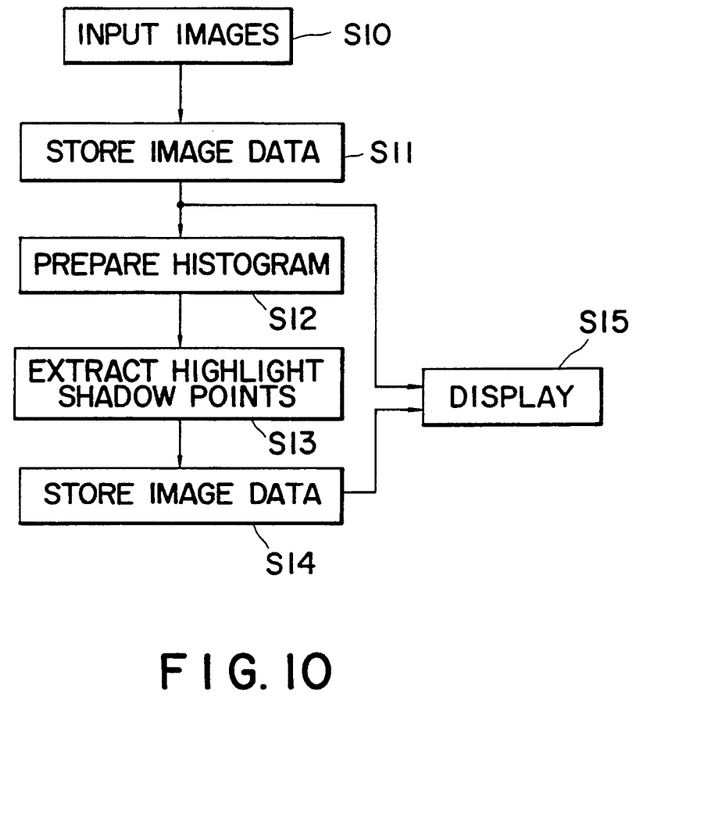
FIG. 10 is a flow chart illustrating different functions of the present invention.
Figure 11A:
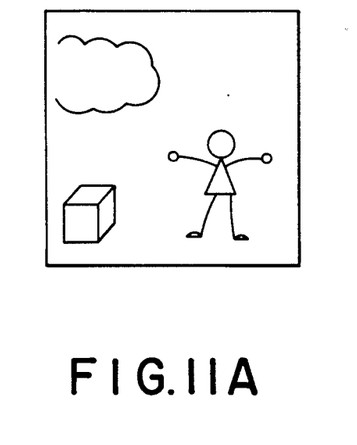
FIGS. 11A to 11D are views each explanatory of the principle of the present invention.
Figure 11B:
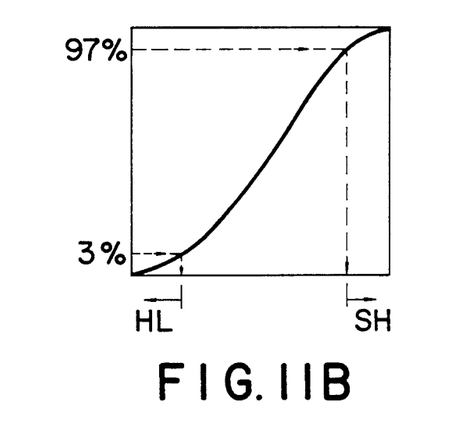
Figure 11C:
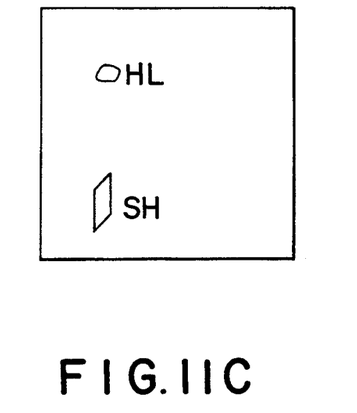
Figure 11D:
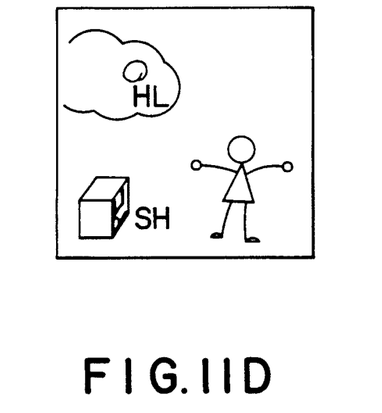

More specifically, as seen from a flow chart in FIG. 10, the color original 120 in the original cassette 102 is initially read by, for example, a rough scan (Step S10). The read out data are stored in the floppy disk 410 or the hard disk 411 (Step S11) to display the read out image in the color monitor 200 (Step S15) as shown in FIG. 11A. The read out images are then density cumulated to prepare a histogram (Step S12) as shown in FIG. 11B. The curve plotted therein includes, for example, a more then 97% density portion and a less than 3% density portion which are extracted as a shadow point SH and a highlight point HL (Step S13). These points are displayed in such a manner as shown in FIG. 11C and then stored in the memory. Consequently, the color monitor 200 carries the image and the highlight and shadow points HL and SH displayed one upon another so that one can determine which point of the image is a candidate point for the highlight or shadow point at first sight. The operator may designate the highlight and shadow points from the picture frame by the use of the mouse or the like on the board section 301 of the data input unit 300 to use the density data in the designated position as the highlight and shadow points to be characteristic points of the gradation conversion.

In this manner, the image formed by the image data C, M, Y and K of the generated color signal is displayed in the color monitor 200 so that a tone or the like of color may be adjusted by the board section 301 to obtain the desired image judging from the displayed image. The color signals C, M, Y and K obtained in the signal processing section 400 are then transmitted to the output unit 500 and half-toned by the half-toning circuit 531. The color signals are further dispatched to the driving circuit 532 of the laser shaping light source 501 to radiate by a binary signal with the dot point output. The laser beam 502 emitted by the light source 501 is inputted to the resonant scanner 504 and the fθ lens 505 and is reflected from the mirror 506 to expose the photosensitive material 503 in the position where the auxiliary scanning drum 510 is located. The exposed photosensitive material 503 is cut by the cutter 512 into predetermined lengths and fed to the automatic developing machine 600 for development thereby forming a four color separation blocks of C, M, Y and K.

The image processing method for the color scanner according to the present invention relies on the cassette system without patching the original to not only simplify the operation but also facilitate a selection of the highlight and shadow points thus improving the speed of setting up of the condition data, with the added advantage free from an error in the input for data setting since most suitable points are extracted from the density cumulated histogram as computed to then select the point therefrom for designation.

It should be understood that many modifications and adaptions of the invention will become apparent to those skilled in the art and it is intended to encompass such obvious modifications and changes in the scope of the claims appended hereto.

What is claimed is:

1. An image processing method in a color scanner which includes an original base operative to receive therein an original cassette that accommodates a color original, a light source for linearly radiating said original cassette as received in said original base, image sensors for color separating a transmitted or reflected light in a linear region of said color original into R, G and B for detection, a signal processing section for processing RGB image signals outputted from said image sensors by linearly scanning said color original to output four color image data such as C, M, Y and black, a color monitor connected to said signal processing section for displaying images of said four color image data, a data input means for inputting data required for said signal processing section and for designating a position where said color monitor displays and an output means for half-toning said four color image data to prepare a printing color separation, which comprises the steps of:
   preparing a density cumulated histogram of said color original by using said RGB image signals said histogram comprising a plurality of points:
   obtaining highlight point candidates and shadow point candidates of said color original due to said density cumulated histogram;
   displaying said highlight point candidates and said shadow point candidates on the image displayed on the color monitor;
   designating a highlight point and a shadow point by using said data input means; and
   setting condition data for said signal processing section in accordance with image data of said designated highlight point and shadow point.

2. An image processing method in a color scanner as described in claim 1, wherein said highlight and shadow point candidates, respectively are selected from points which are less than 3% and more than 9% of said density cumulated histogram.

3. An image processing method in a color scanner as described in claim 1, wherein said density cumulated histogram is prepared due to data stored in a flopply disk or a hard disk.

4. An image processing method in a color scanner as described in claim 1, wherein said highlight point candidates and shadow point candidates are stored in a memory.

5. An image processing method in a color scanner as described in claim 1, wherein said image data are density data which are used for characteristic points of gradation conversion.

6. An image processing method in a color scanner as described in claim 1 further includes the step of correcting color tone of the displayed image by using said data input means.

* * * * *